USA Patent

Hill et al.

[11] 3,757,960
[45] Sept. 11, 1973

[54] MATERIAL HANDLING APPARATUS
[75] Inventors: William J. Hill; William R. Wynn, both of Holden, Mass.
[73] Assignee: Morgan Construction Company, Worcester, Mass.
[22] Filed: Dec. 22, 1971
[21] Appl. No.: 210,853

[52] U.S. Cl. .................................. 214/1 PB, 53/26
[51] Int. Cl. ............................................ B65b 35/30
[58] Field of Search .................. 214/1 P, 1 PB, 6 S, 214/DIG. 3; 53/26

[56] References Cited
UNITED STATES PATENTS
3,127,829  4/1964  Rossi .......................... 214/1 PB X
3,647,092  3/1972  Bulat et al. .......................... 214/6 S
3,135,076  6/1964  Hill .............................. 214/1 PB X
3,497,084  2/1970  Murrah ........................... 214/1 P X FOREIGN PATENTS OR APPLICATIONS
1,074,496  1/1960  Germany ............................. 214/6 S
1,316,672  12/1962  France ............................. 214/1 PB Primary Examiner—Gerald M. Forlenza
Assistant Examiner—Frank E. Werner
Attorney—C. Yardley Chittick et al.

[57] ABSTRACT

An apparatus for handling elongated elements which includes a downwardly sloping ramp along which the elements move laterally into an assembly notch. Alignment devices are provided at either end of the assembly notch for aligning the ends of elements being collected therein. The alignment devices axially adjust the elements by contacting the ends thereof.

3 Claims, 4 Drawing Figures

MATERIAL HANDLING APPARATUS

DESCRIPTION OF THE INVENTION

This invention relates generally to the art of material handling, and is particularly concerned with a novel and improved apparatus for assembling elongated elements of approximately equal length, and for aligning the ends of the assembled elements in preparation for a subsequent banding operation. The invention is especially useful in the handling of elongated product lengths such as for example bars produced by a rolling mill, although it will be appreciated from the following detailed description that other uses are also contemplated.

After the rolling operation has been completed in a bar mill, the bars are normaly subdivided into shorter equal lengths, cooled and then gathered and tied into bundles. Thereafter, the bundles may be sawn or cut to further subdivide the bars contained therein. For this reason, it is essential that the ends of the bars in any given bundle be in alignment for otherwise, the resulting cut sections will be of different lengths.

One of the principal objects of the present invention is to provide a novel and improved apparatus for laterally receiving and gathering individual elongated elements of approximately equal length into a group, with the ends of the elements in proper lateral alignment in preparation for a subsequent tying or bundling operation. A more specific object of the invention is the provision of novel equipment which is especially suitable for, although not limited to, the handling of bars and other like product lengths produced by a rolling mill. A further object is the provision of means for laterally delivering elongated elements of approximately equal length to a collecting zone which is preferably defined by an assembly notch. The assembly notch is provided at opposite ends with alignment devices, the latter operating to axially adjust the elements in the notch by contacting the ends thereof. Still another object of the present invention is the provision of a relatively simple yet rugged apparatus capable of operating in a dependable manner over extended periods with minimum superivison by operating personnel.

These and other objects and advantages of the present invention will become more apparent as the description proceeds with the aid of the accompanying drawings in which.

Figure 1:
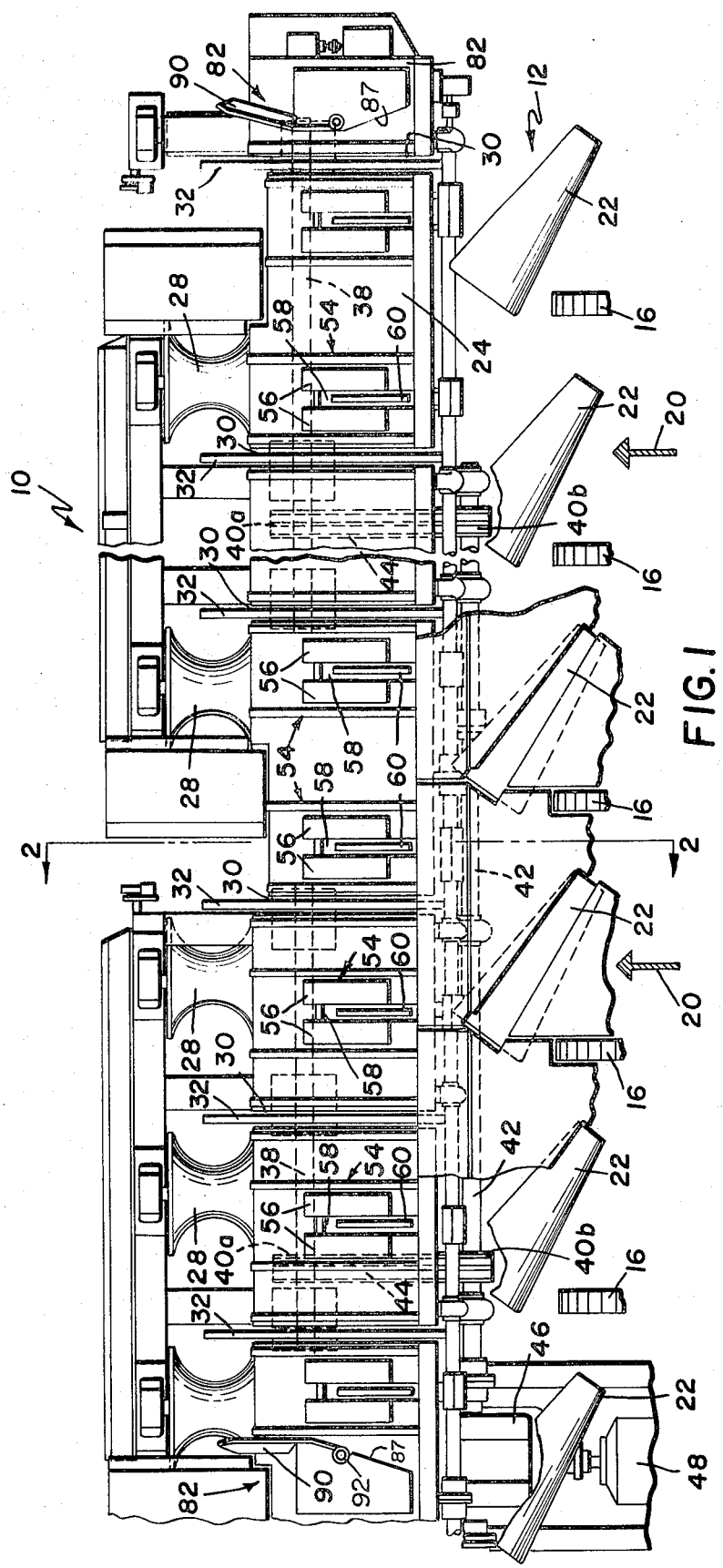
FIG. 1 is a plan view of a preferred embodiment of an apparatus embodying the concepts of the present invention.
Figure 2:
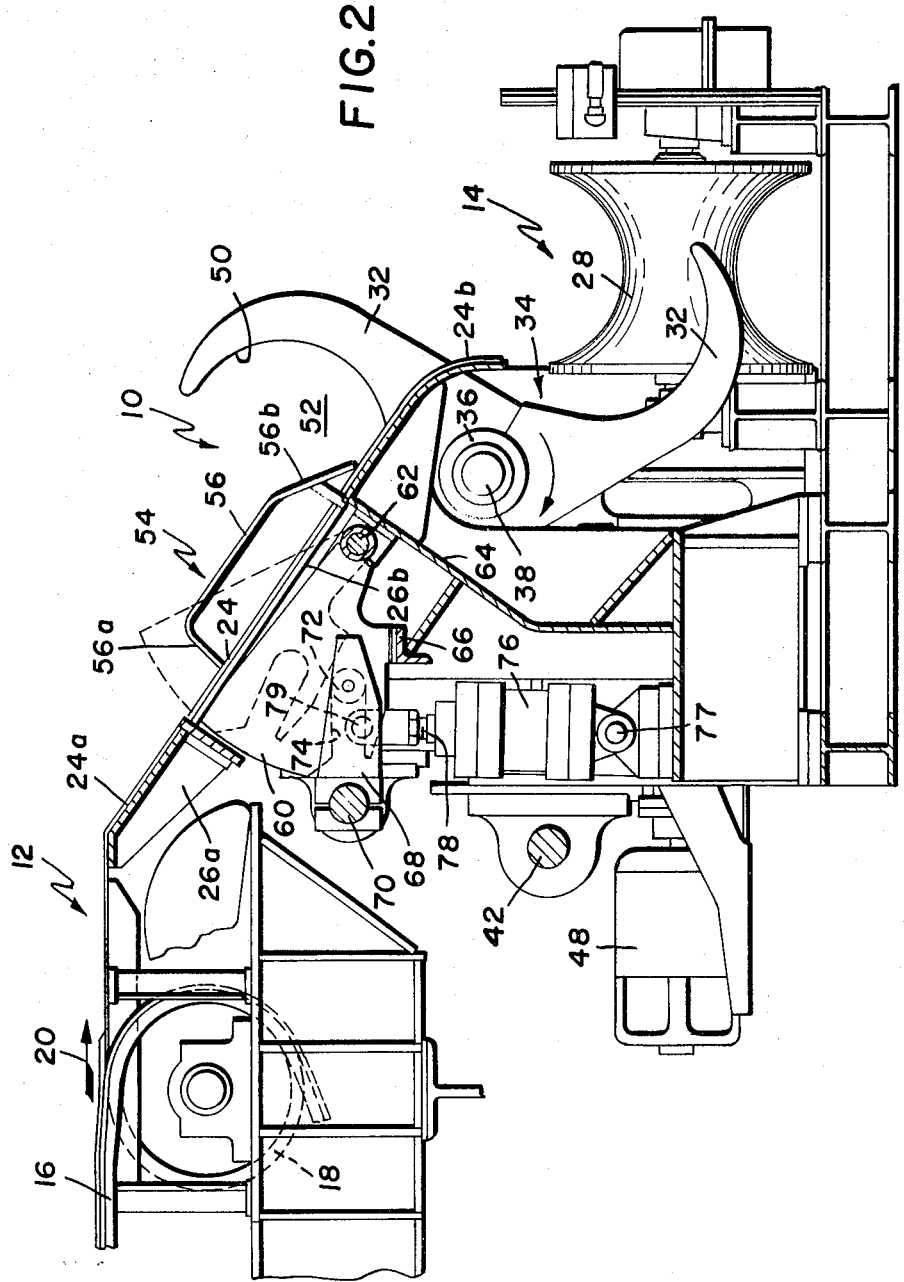
FIG. 2 is a sectional view on an enlarged scale taken along lines 2—2 of FIG. 1.

With reference initially to FIGS. 1 and 2 of the drawings, a preferred embodiment of a material handling apparatus embodying the concepts of the present invention is generally indicated at 10. The apparatus is located between a bar delivery apparatus 12 and a bundling station 14.

The bar delivery apparatus includes a plurality of delivery chains 16 running continuously between sprockets, only one of which is shown at 18 in FIG. 2. The chains carry bars or other like elongated elements in a lateral direction indicated schematically in the drawings by the arrows 20. As each bar leaves the delivery ends of the chains 16, it is received on a plurality of truncated skewed separating rollers 22 which are driven continuously in a clockwise direction as viewed in FIGS. 1 and 2. The separating rollers 22 are the subject of a separate U.S. Patent application Ser. No. 46,969 assigned to the same assignee as the present invention. The rollers 22 operate to laterally separate successive bars while continuing to move the bars towards the apparatus 10.

The apparatus 10 includes an inclined or sloping ramp indicated generally at 24 which as herein illustrated, may conveniently be formed in two sections 26a and 26b. The upper end 24a of the ramp is positioned to laterally receive bars from the skewed rollers 22. The other lower end of the ramp is preferably curved downwardly as at 24b, and is located above and to one side of a plurality of aligned bundling rollers 28 at the bundling station 14.

As can best be seen in FIG. 1, the longitudinal continuity of ramp 24 is interrupted at spaced locations as at 30 to accommodate rotational movement thereacross of the curved arms 32 on bundling wheels, one of which is indicated generally at 34 in FIG. 2. The bundling wheels have hubs 36 which are keyed to coaxial shafts 38. Shafts 38 are journalled for rotation between bearings (not shown) and are intermittently driven in a clockwise direction as viewed in FIG. 2 by any convenient means. For example, in the embodiment herein disclosed, the shafts 38 are provided at suitable locations with sprockets 40a which are aligned laterally with sprockets 40b on a drive shaft 42. Drive chains 44 run between the sprockets 40a and 40b. The drive shaft 42 is driven through a combination brake and gear reducer 46 by means of a motor 48. As shown in FIG.s 1 and 2, the bundling wheels 34 have been rotatably adjusted to an operative position at which the concave inner edges 50 of the uppermost arms 32 cooperate with the lower end of the ramp 24 to define a longitudinally extending assembly notch 52.

Preferably, the apparatus 10 is further provided with a plurality of stops 54 conveniently spaced along the length of and located intermediate the ends 24a and 24b of the ramp 24. Each stop 54 includes a pair of members 56 straddling a slot 58 in the ramp surface. The forward ends of the stop members form shoulders 56a which serve as a means for interrupting lateral movement of bars down the ramp towards the assembly notch 52. The back ends of the stop members preferably slop downwardly as at 56b. The slots 58 accommodate movement therethrough of ejectors 60 which are pivotally attached as at 62 to the underlying frame 64 of the apparatus. The ejectors are pivotally manipulated between lowered inoperative positions resting on stops 66, and raised operative position shown by the dot-dash lines in FIG. 2.

The means for pivotally manipulating the ejectors 60 includes levers 68 fixed to a common rotatable shaft 70 which is located above and parallel to shaft 42. One lever 68 is provided for each ejector 60. Each lever 68 has a laterally extending pin 72 which protrudes into a slot 74 in the ejector 60. A number of cylinders 76 are provided along the length of the apparatus. Each cylinder is pivotally mounted as at 77 to the base structure of the apparatus. The cylinders 76 have extensible piston rods 78 which are attached as at 79 to the levers 68. Extension of the piston rods 78 causes upward pivotal movement of the levers 68 about the axis defined by shaft 70, and this in turn moves the ejectors 60 up through the slots 58 in the ramp 24 to the positions indicated by the dot-dash lines in FIG. 2.

Figure 3:
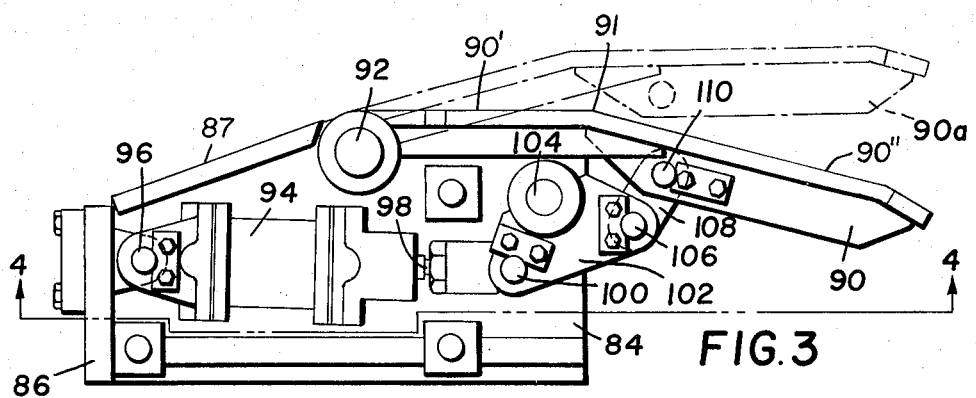
FIG. 3 is a plan view on a greatly enlarged scale of one of the alignment devices with the top cover plate removed in order to better illustrate interior components; and, FIG. 4 is an enlarged sectional view taken along lines 4—4 of FIG. 3, showing the top cover plate in place.
Figure 4:
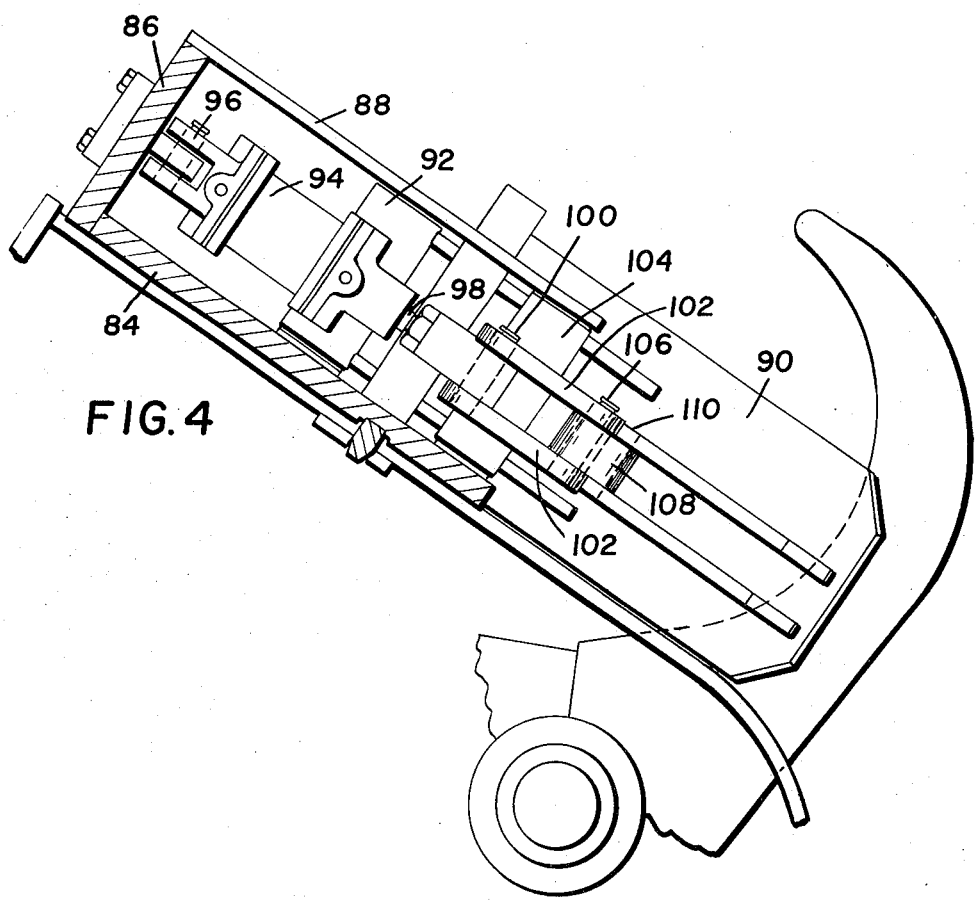

As is best shown in FIG. 1, the apparatus 10 further includes alignment devices 82 located at opposite ends of the assembly notch 52. The alignment devices are identical in construction, and hence a description of one will apply equally as well to the other. Referring additionally to FIGS. 3 and 4, it will be seen that each alignment device includes a housing having a base plate 84, a rear plate 86 and a top cover plate 88. A paddle member 90 is pivotally mounted as at 92 between the base plate 84 and top cover plate 88. A fluid actuated cylinder 94 is pivotally attached as at 96 to the back plate 86. Cylinder 94 has an extensible piston rod 98 which is pivotally attached as at 100 to a pair of bell cranks 102, the latter being pivotally mounted as at 104 between the base and top plates 84 and 88. The bell cranks 102 are in turn pivotally connected as at 106 to one end of an intermediate link 108, the other end of the intermediate link being pivotally connected as at 110 to the back side of the paddle member 90.

The housing of the alignment device is further provided with a fixed entry guide plate 87 which extends angularly inwardly towards the center of the material handling apparatus 10 from the rear plate 86 to the pivotal mounting 92 of the paddle 90. The paddle 90 is in turn provided with an element striking and alignment face which is made up of two angularly disposed planar surfaces 90' and 90'' meeting at an intermediate shoulder 91.

As can best be seen in FIG. 3, when the paddle member 90 is inoperatively retracted as shown by the solid lines, the surface 90' is generally perpendicular to rear plate 86, thereby cooperating with the entry guide plate 97 to form an angle which is greater than 180°. Extension of the piston rod 98 causes the paddle member 90 to be pivoted about axis 92 to an advanced operative position shown by the dot-dash lines at 90a. In this position, surface 90' lies in the same plane as that of entry guide plate 87 and thus forms a continuation thereof which terminates at the shoulder 91. The surface 90'' extends in a direction transverse to the length of the receiving notch 52 to thereby define one end thereof. In FIG. 1, the left-hand alignment device is shown with its paddle member operatively advanced, while the right-hand alignment device has its paddle member 90 operatively adjusted to the retracted position.

Having thus described the principal components of the preferred embodiment illustrated in the drawings, the operation of the apparatus will now be reviewed.

The delivery chains 16 and separating rollers 22 operate to laterally deliver successive bars to the apparatus 10. The bars move downwardly along ramp 24 and accumulate against the shoulders 56a on the stops 54. After several bars, say four or five, have accumulated against the stops 54, the ejectors 60 are actuated to move the bars over the stops for continued downward lateral movement across the ramp 24 and into the assembly notch 52. At this point, it will be understood that the bars may be axially misaligned with ends protruding from either the left or right as viewed in FIG. 1.

The alignment devices 82 operate to correct this axial misalignment in the following manner: the misaligned bar ends will initially contact one or the other of the oppositely disposed inwardly directed guide plates 87. At this point in time, the kinetic energy of the laterally moving bars will be sufficient when converted to an axial force as a result of the bar ends striking the guide plates 87 to begin gradually shifting and axially aligning the bars prior to the bar ends being exposed to the striking surfaces 90' of the paddles. As the bar ends pass by the pivot points 92, the striking surfaces 90' will take over and continue to gradually axially align the bar ends until such time as complete alignment is achieved. This latter condition is reached when the bar ends lie between the faces 90'' of the advanced paddles 90. Operation of the paddles 90 of the alignment devices 82 continues uninterruptedly as the appropriate number of bars or other elongated elements are collected in the notch 52. At this point, motor 48 is energized to rotate the bundling wheels in a clockwise direction. When this occurs, the bars previously collected and aligned in notch 52 are carried downwardly on the curved arms 32 and are eventually deposited on the bundling rollers 28. The bars are then tied and the resulting bundle removed from the bundling station while subsequent bars are being collected and aligned in the receiving notch 52.

In light of the foregoing description, it will now be evident to those skilled in the art that modifications may be made to the embodiment herein disclosed without departing from the spirit and scope of the invention as defined by the claims appended hereto. For example, it will be understood that although the apparatus 10 is particularly useful in the handling of products produced by a bar mill, its use is not restricted to this particular application and in fact the apparatus may be employed advantageously to handle any type of elongated element where end alignment is of importance prior to tieing or bundling. Moreover, under certain operating conditions, it may be possible to operate the apparatus without the use of the stops 54 and ejectors 60. For example, this might be possible where the normal delay between delivery of successive bars would be sufficient for cycling the bundling wheels.

It is our intention to cover all changes and modifications of the embodiment herein chosen for purposes of disclosure which do not depart from the spirit and scope of the invention.

We claim:

1. Apparatus for collecting a plurality of elongated elements of substantially equal length into a group in which the ends of the elements are in general lateral alignment, said apparatus comprising: means defining a downwardly sloping ramp, the upper end of said ramp being positioned to laterally receive the elongated elements; means cooperating with the lower end of said ramp to define an assembly notch into which elongated elements moving laterally down said ramp are collected in a group, and alignment means at opposite ends of said assembly notch for aligning the ends of the elongated elements being gathered therein, each said alignment means including a fixed guide plate extending angularly inwardly towards the center of the apparatus, said guide plate being positioned to be contacted by and to thereby gradually impart axial alignment to the ends of adjacent axially misaligned elements laterally entering said assembly notch, said alignment means further including a paddle member mounted for pivotal movement relative to said fixed guide plate between an operative position pivotally advanced towards the center of the apparatus and a pivotally retracted inoperative position, said paddle member having an element striking and alignment face made up of two angularly arranged planar surfaces which meet to form an intermediate shoulder, the angular relationship of said planar surfaces being such that when the paddle member is operatively positioned, one of said planar surfaces provides a continuing extension of said fixed guide plate while the other of said planar surfaces extends transversally to the length of the receiving notch to thereby define one end thereof, and means for moving said paddle member between said operative and inoperative positions.

2. The apparatus as claimed in claim 1 further characterized by stop means intermediate the ends of said ramp and against which elongated elements collect before moving into said assembly notch; and, means for moving elongated elements over said stop means for continued lateral movement into said assembly notch.

3. The apparatus as claimed in claim 1 wherein said means cooperating with the lower end of said ramp to define said assembly notch is comprised of a plurality of rotatable members spaced along a common axis of rotation, each of said members having a hub with a plurality of curved arms extending radially therefrom, the said arms being arranged to cooperate with said ramp in forming the assembly notch.

* * * * *